United States Patent Office 2,777,776
Patented Jan. 15, 1957

2,777,776
FREE-FLOWING POWDERED WAXES

Joseph A. Kieras, New London, Pa., assignor to The Atlantic Refining Company, Philadelphia, Pa., a corporation of Pennsylvania No Drawing. Application May 3, 1954,
Serial No. 427,358

6 Claims. (Cl. 106—272)

This invention relates to free-flowing powdered waxes and more specifically to powdered friable waxes containing tri-calcium orthophosphate.

Powdered waxes have many potential industrial uses. At the present time their uses are in dance floor preparations and in wax molding compounds. Powdered waxes have many other potential uses, for example, as blending agents with other waxes and with other materials. However, certain inherent undesirable characteristics have prevented full realization of their potential utility. The main difficulty with powdered waxes has been that the particles tend to agglomerate or cohere to each other and thereby lose their free-flowing properties.

It is the purpose of this invention to provide free-flowing powdered waxes by preventing agglomeration or cohesion of the wax particles.

It is a further purpose of this invention to provide free-flowing powdered waxes by incorporating in powdered, friable waxes a small amount of tri-calcium orthophosphate.

According to the instant invention a friable wax is ground in a hammer mill or similar device to the desired particle size. From 0.25 percent to 2.0 percent by weight of powdered tri-calcium orthophosphate based on the weight of the wax is then added to the powdered wax. While larger amounts of the tri-calcium orthophosphate may be used, it is usually preferred that unnecessarily large amounts be avoided in order to prevent contamination of the wax. In general, from 0.5 percent to 1 percent of the powdered tri-calcium orthophosphate has been found to be sufficient for the purpose of preventing agglomeration of the wax and provide free-flowing properties to the powdered wax.

Tri-calcium orthophosphate is manufactured commercially as a precipitated amorphous, finely-divided, rather light and fluffy powder. This form of tri-calcium orthophosphate is particularly suitable for the purpose of the instant invention.

The present invention is applicable to paraffinic waxes particularly of petroleum origin, having a melting point in excess of 150° F. as measured by the ASTM cooling curve method (D87–42), microcrystalline waxes particularly those extracted from petroleum and having a melting point in excess of 180° F. as measured by the ASTM drop point method (D127–49), natural waxes such as ozocerite, ceresin, montan and similar waxes, and especially the natural vegetable waxes such as carnauba, palm, ouricuri, raffia, candelilla, Madagascar and similar high melting point friable waxes. In general, any wax which can be broken up into the form of powder is suitable for this invention, particularly those friable at room temperatures. The desired amount of tri-calcium orthophosphate may be added to the powdered wax by mechanical mixing or it can be added in incremental portions to the wax as it is being ground. This latter procedure is particularly useful for waxes of "borderline" friability, that is those which break up but tend to agglomerate immediately after being broken up.

It is an important aspect of the instant invention that the tri-calcium orthophosphate be added to the wax surface only. The incorporation of the above specified amounts of tri-calcium orthophosphate in molten wax does not improve its free-flowing properties when such wax is solidified and ground. The action of the tri-calcium orthophosphate has been found to be quite specific, for example, mono- or di-calcium orthophosphate do not possess the property of rendering powdered waxes free-flowing. Similarly, other calcium compounds, such as calcium stearate and the like, fail to produce a free-flowing powdered wax.

The following examples are included for the purpose of illustrating the instant invention and are not to be construed as limiting the scope thereof.

Example I

A sample of yellow microcrystalline wax having a melting point of 190° F. was reduced to a powder in a hammer mill. The sample was divided into two parts; one part being used as a control and the other part as the experimental sample. To the experimental sample was added 1 percent of finely divided commercial tri-calcium orthophosphate and the mixture thoroughly blended. The control and experimental samples were then allowed to stand for a period of a week at room temperature. At the end of this time the control sample was found to be almost completely agglomerated and it had adhered to the sides of the containing vessel, whereas the experimental sample was completely free-flowing and none of it had adhered to the containing vessel. This free-flowing property of a powdered wax-tri-calcium orthophosphate mixture is retained indefinitely.

Example II

A sample of highly refined microcrystalline wax completely white in color, having a melting point of 190° F. to 195° F. and approximately 100 mesh particle size, was divided into two portions. One portion was used as a control and to the other portion 1 percent of finely divided tri-calcium orthophosphate was added and blended thoroughly therewith. At the end of 48 hours the control sample was found to be somewhat agglomerated and only partially free-flowing. The sample containing the tri-calcium orthophosphate was found to be completely free-flowing and almost fluffy in character.

Example III

Two portions of a sample of paraffin wax of 160° F. melting point obtained from a Tucupido crude distillate cut and deoiled by methyl ethyl ketone to approximately 2 to 3 percent oil were ground to 10 to 20 mesh. During the grinding of one portion, approximately 1 percent of finely divided commercial tri-calcium orthophosphate was added in ten equal increments. The ground particles of this portion of the sample were of uniform size and completely free-flowing. The other portion of the sample was ground in the absence of tri-calcium orthophosphate. It contained many large irregular pieces which adhered together and to the walls of the container after standing for twenty four hours. The portion treated with tri-calcium orthosphosphate, however, remained completely free-flowing.

The present invention has been found to be applicable not only to pure friable waxes, but to mechanical mixtures of such waxes and mixtures of waxes with other finely divided agents. It likewise is applicable to powdered blends of different waxes made by melting the waxes together, solidifying and grinding, such as blends of microcrystalline and paraffin waxes or blends of paraffin waxes with natural waxes such as carnauba.

I claim:
1. A free-flowing powdered wax composition comprising a physical mixture of a powdered friable wax and from 0.25 percent to 2.0 percent powdered tri-calcium orthophosphate said tri-calcium orthophosphate being distributed on the surface of the particles of the powdered wax.

2. A free-flowing powdered wax composition comprising a physical mixture of a powdered paraffinic wax having a melting point in excess of 150° F. and from 0.25 percent to 2.0 percent powdered tri-calcium orthophosphate said tri-calcium orthophosphate being distributed on the surface of the particles of the powdered wax.

3. A free-flowing powdered wax composition comprising a physical mixture of powdered microcrystalline wax having a melting point in excess of 180° F. and from 0.25 percent to 2.0 percent powdered tri-calcium orthophosphate said tri-calcium orthophosphate being distributed on the surface of the particles of the powdered wax.

4. A free-flowing powdered wax composition comprising a physical mixture of a powdered friable wax and from 0.5 percent to 1.0 percent powdered tri-calcium orthophosphate said tri-calcium orthophosphate being distributed on the surface of the particles of the powdered wax.

5. A free-flowing powdered wax composition comprising a physical mixture of a powdered paraffinic wax having a melting point in excess of 150° F. and from 0.5 percent to 1.0 percent powdered tri-calcium orthophosphate said tri-calcium orthophosphate being distributed on the surface of the particles of the powdered wax.

6. A free-flowing powdered wax composition comprising a physical mixture of a microcrystalline wax having a melting point in excess of 180° F. and from 0.5 percent to 1.0 percent powdered tri-calcium orthophosphate said tri-calcium orthophosphate being distributed on the surface of the particles of the powdered wax.

References Cited in the file of this patent

UNITED STATES PATENTS

| | | |
|---|---|---|
| 77,784 | Walker | May 12, 1868 |
| 1,793,420 | Block | Feb. 17, 1931 |
| 2,046,986 | Winkelmann | July 7, 1936 |
| 2,081,236 | Hinegardner | May 25, 1937 |
| 2,115,054 | Winkelmann | Apr. 26, 1938 |
| 2,301,806 | Hamilton et al. | Nov. 10, 1942 |